Figure 1:
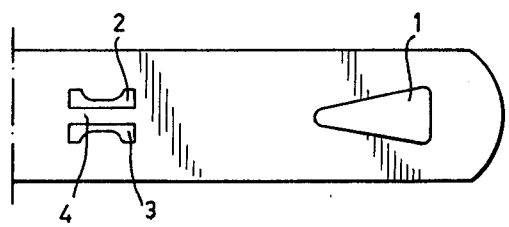

United States Patent Office 3,261,100
Patented July 19, 1966

3,261,100
ARRANGEMENT FOR INTERCONNECTING
TWO ELASTIC TAPES
Michel Quenot, Besancon, Doubs, France, assignor to
Etablissements Quenot & Cie S.A., Besancon, Doubs,
France
Filed May 25, 1964, Ser. No. 369,662
Claims priority, application France, Dec. 17, 1963,
957,541
5 Claims. (Cl. 33—138)

The present invention has for its object an arrangement for interconnecting two elastic tapes, chiefly a scale-carrying tape for length-measuring instruments and the retracting spring tape.

The securing of a scale-carrying steel tape of a measuring instrument, for instance a self-winding tape measure, to its returning or balancing spring is obtained often by means of two lateral notches formed in the terminal section of the spring tape, on the one hand adapted to engage a corresponding eye, generally T-shaped, carried on the upper surface of the scale-carrying tape on the other hand.

Such securing means show, however, the drawback consisting in that when completely unwinding the tape outside its casing, either during its use or during its assembly, the connection between the cooperating ends of the measuring tape and of the spring tape is far from providing perfect continuity. As a matter of fact, the end of the spring has a tendency to shift away from its assembled position occupied compulsorily by it by reason of the compression of the joining convolutions while the tape is still in a partly wound condition. Said drawback is particularly apparent in the case of a winding drum of a reduced diameter.

Thus, the end of the spring tape moves away from the surface of the scale-carrying tape and has a tendency to abut against the lower inner edge of the outlet slot of the casing, which prevents normal operation of the tape measure and makes the replacement of the measuring tape a difficult matter in the case of damage. Said drawback is ascribable to the fact that the securing is provided only in a single assembling plane, to wit, through the contact between the two lateral notches of the spring and the inner edge of the eye formed in the scale-carrying tape.

The present invention has now for its object to eliminate this drawback and to this end, there is provided an arrangement for securing endwise two metal tapes incorporating means for removably interconnecting rigidly said two tapes, the terminal section of one of which is threaded through at least two openings formed at two different points of the length of the end of the other tape.

This allows holding the cooperating tape ends substantially in the same plane. According to the invention, at least a portion of the edges of the opening engaged by the free end of the terminal section of the first-mentioned tape encloses said free end which is threaded into the cooperating opening and is clamped elastically along its edges by said edges of the opening.

Last-mentioned opening is formed preferably by two U-shaped cuts facing each other through the bottom sides of the U which extend longitudinally of the tape while the open end of each U faces the nearest corresponding edge of the tape.

Furthermore, the terminal section of the first tape ends with a fork of which the sides are interconnected by a semi-circular edge forming the front end of said terminal section.

Figure 2:
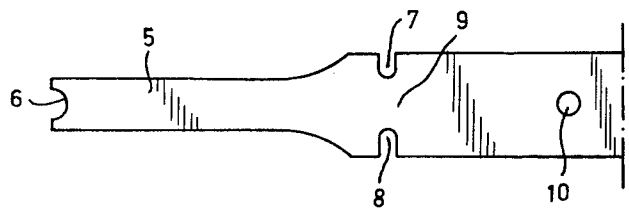
Figure 3:
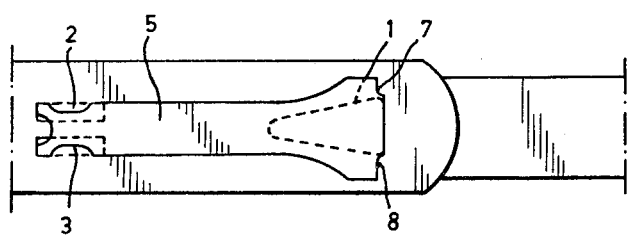
Figure 4:

The accompanying drawings illustrate by way of example a preferred embodiment of the invention ensuring the assembly of two elastic tapes. In said drawings:

FIG. 1 is a plan view of the end of one of the tapes,
FIG. 2 is a similar view of the end of the other tape,
FIG. 3 is a plan view of the two tape ends when assembled,
FIG. 4 is a side view of the assembly illustrated in FIG. 3.

The elastic tapes illustrated in FIGS. 1 and 2 form respectively the scale-carrying tape of a measuring instrument such as a ten-yard tape measure, and the spring tape urging said scale-carrying tape back or balancing it.

As illustrated, the scale-carrying measuring tape illustrated in FIG. 1 is provided in the vicinity of its end with a triangular opening 1 the base of which extends transversely of the tape while its apex lies on the side of said base facing away from said end. The tape illustrated in FIG. 1 is also provided with two U-shaped slots 2 and 3 the bottom edges of which extend longitudinally of the tape and face each other while the open end of the U faces the corresponding nearest edge of the tape; between said slots, the tape material forms a web or bridge 4.

The end of the spring tape illustrated in FIG. 2 is cut in the shape of a tongue 5 the breadth of which is substantially equal to the length of the base of the triangular opening 1 in the first tape while the outer free end of said tongue is provided with a semi-circular recess 6 which gives it a forked shape. At a point located to the rear of the front edge of said forked end which lies at a distance from said edge which is equal to that separating the base of the opening 1 from the left-hand or remote edges of the U-shaped slots 2 and 3, the spring tape is provided with two notches 7 and 8 extending transversely of the spring tape and separated by a web or bridge 9 the breadth of which is at the utmost equal to the length of the base of the slot 1.

The scale-carrying tape is secured to its spring tape in the following manner:

During a first stage, the spring is threaded through the triangular opening 1 and the notches 7 and 8 are thus caused to engage the edges of the material at either end of the base of said opening.

During the next stage, the tongue 5 terminating the spring is incurved downwardly so that the two sides of the terminal forked end of said tongue extending over the web 4 may be slid underneath the flaps formed by the sides of the U-shaped slots facing the edges of the scale-carrying tape and engage the transverse ends of said slots which are furthest remote from the triangular opening 1. The tongue 5 is then returned into a flat condition with the sides of its forked end extending towards the left-hand side of FIG. 3.

The end of the tongue 5 of the spring blade is thus held fast between the flaps extending along the outer edges of the slots 2 and 3. Consequently, the ends of the scale-carrying tape and of its associated spring tape are assembled in perfect joining relationship (FIGS. 3 and 4), so that it is possible to readily draw the measuring tape out of its casing without any portion of either tape abutting against said casing.

According to a modification, the retracting or balancing spring may be provided with a further opening 10 (FIG. 2) which allows, when replacement of the tape is necessary, introducing locking means such as a nail or a match through the spring tape so as to hold the spring in position when drawn out of the casing.

What I claim is:
1. A system of two elastic interconnectable tapes comprising a first elastic tape provided with at least two openings at different points of its length one of said openings consisting of generally U-shaped slots and the other opening having longitudinal edges, and a second elastic tape including a terminal section of a reduced breadth adapted to be threaded in succession through said openings in the first tape and the terminal portion of said section being held fast between the longitudinal edges of the opening in the first tape which is the second opening to be engaged by the said terminal section, and said slots defining oppositely disposed inwardly projecting flaps in the plane of said first tape for overlying said terminal portion of said second tape and holding said terminal portion substantially in the plane of said first tape, whereby said tapes are connected in a substantially flush connection.

2. A system of two elastic interconnected tapes comprising a first elastic tape having an end and provided along its longitudinal axis with a first triangular opening adjacent said end and the apex of which faces away from said end of said first tape and the base of which faces said end and having a second opening on the side of the apex of the first opening facing away from said end, and a second tape having another end including a terminal section having a portion of a reduced breadth equal at the utmost to the maximum breadth of the first opening in the first tape and having another portion the sides of which are clamped beneath the outer longitudinal edges of said second opening, the longitudinal edges of said second tape being transverse notches at a distance to the rear of said another end of its terminal section which is equal to that separating the transverse edges of the two openings in the first tape which are furthest removed from each other, said notches engaging the first tape at both ends of the base of the first opening.

3. A system of two elastic interconnected tapes comprising a first elastic tape having an end and provided along its longitudinal axis with a first triangular opening adjacent said end and the apex of which faces away from said end of said first tape and the base of which faces said end and having two U-shaped longitudinal slots arranged symmetrically of said longitudinal axis on the side of the apex of the first opening facing away from said end and provided with longitudinal inner sides defining between them a web aligned with the medial line of the first opening passing through its apex, said slots each having a base leg, the base legs extending substantially parallel to corresponding longitudinal edges of the first tape, and a second tape having another end and including a terminal section having a portion of a reduced breadth substantially equal to the maximum breadth of the first opening in the first tape and the terminal section having another portion disposed clamped under outer U-shaped edges of the areas of said first tape defining said slots and disposed extending over said web therebetween, the longitudinal edges of said second tape having transverse notches at a distance from the transverse outer edge of its terminal section which is equal to that separating the transverse edges of the first opening and of the slots in the first tape which are furthest removed from each other, said notches engaging the first tape at both ends of the base of the first opening.

4. A system of two elastic interconnected tapes comprising a first elastic tape having an end and provided along its longitudinal axis with a first triangular opening adjacent said end and the apex of which faces away from said end of said first tape and the base of which faces said end and having two longitudinal slots arranged symmetrically of said longitudinal axis on the side of the apex of the first opening facing away from said end and provided with longitudinal inner sides defining between them a web aligned with the medial line of the first opening passing through its apex, said slots each having a base leg, the base legs extending substantially parallel to corresponding longitudinal edges of the first tape, and a second tape having another end and including a terminal section having a portion of a reduced breadth substantially equal to the maximum breadth of the first opening in the first tape and the terminal section having another portion disposed clamped under outer U-shaped edges of the areas of said first tape defining said slots and disposed extending over said web therebetween, the transverse outer edge of said terminal section being provided with a semi-circular recess engaging the extreme ends of the longitudinal U-shaped slots, the longitudinal edges of said second tape having transverse notches at a distance to the rear of said outer edge of its terminal section which is equal to that separating the transverse edges of the first opening and of the slots in the first tape which are furthest removed from each other, said notches engaging the first tape at both ends of the base of the first opening.

5. In a tape measure including a first wound scale-carrying tape having an end and provided along its longitudinal axis with a first triangular opening adjacent said end and the apex of which faces away from said end of said first tape and the base of which faces said end and having two U-shaped longitudinal slots arranged symmetrically of said longitudinal axis on the side of the apex of the first opening facing away from said end and provided with longitudinal inner sides defining between them a web aligned with the medial line of the first opening passing through its apex, said slots each having a base leg, the base legs extending substantially parallel to corresponding longitudinal edges of the first tape, and a second tape serving as a spring to urge the first tape rearwardly into its wound condition and including a terminal section having a portion of a reduced breadth equal at the utmost to the maximum breadth of the first opening in the first tape and having another portion which has its sides clamped under outer U-shaped edges of the areas of said first tape defining said slots and disposed extending over said web therebetween, the longitudinal edges of said second tape having transverse notches at a distance to the rear of the transverse edge of its terminal section which is equal to that separating the transverse edges of the first opening and of the slots in the first tape which are furthest removed from each other, said notches engaging the first tape at both ends of the base of the first opening, said slots defining oppositely disposed inwardly projecting flaps in the plane of said first tape for overlying said terminal section of said second tape and holding said terminal portion substantially in the plane of said first tape, whereby said tapes are connected in a substantially flush connection.

References Cited by the Examiner

UNITED STATES PATENTS

| | | | |
|---|---|---|---|
| 249,909 | 11/1881 | Donahue | 287—64 |
| 1,628,249 | 5/1927 | Kirfman | 287—64 |
| 2,080,815 | 5/1937 | Gasstrom | 33—138 |
| 2,510,939 | 6/1950 | Carlson | 242—107.3 |
| 2,513,105 | 6/1950 | Poupitch | 85—37 |
| 2,646,940 | 7/1953 | Volz | 33—138 X |
| 3,141,628 | 7/1964 | Evans | 242—84.8 |

ROBERT B. HULL, *Primary Examiner.*

ISAAC LISANN, *Examiner.*

B. DONAHUE, *Assistant Examiner.*